March 12, 1968 R. T. KAISER 3,373,329

DEVICE FOR DRIVING RECORDING CHARTS AT ANY ONE OF A PLURALITY OF PREDETERMINED SPEEDS

Filed March 31, 1965 2 Sheets-Sheet 1

INVENTOR.
ROBERT THOMAS KAISER
BY
THOMAS P. MAHONEY
ATTORNEY

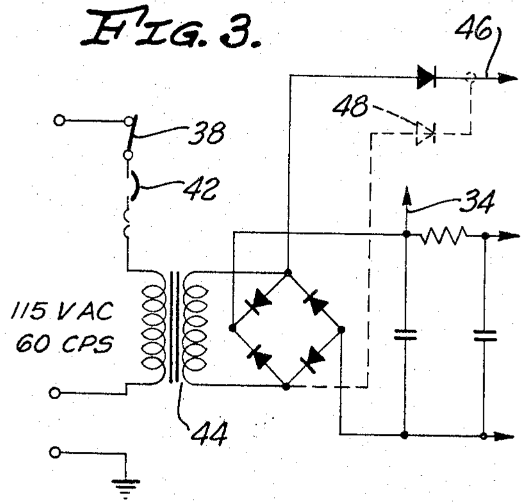
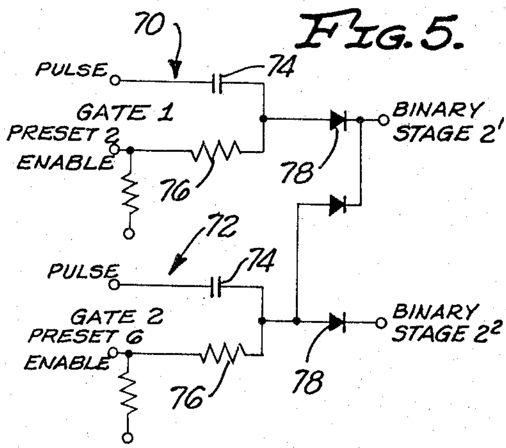
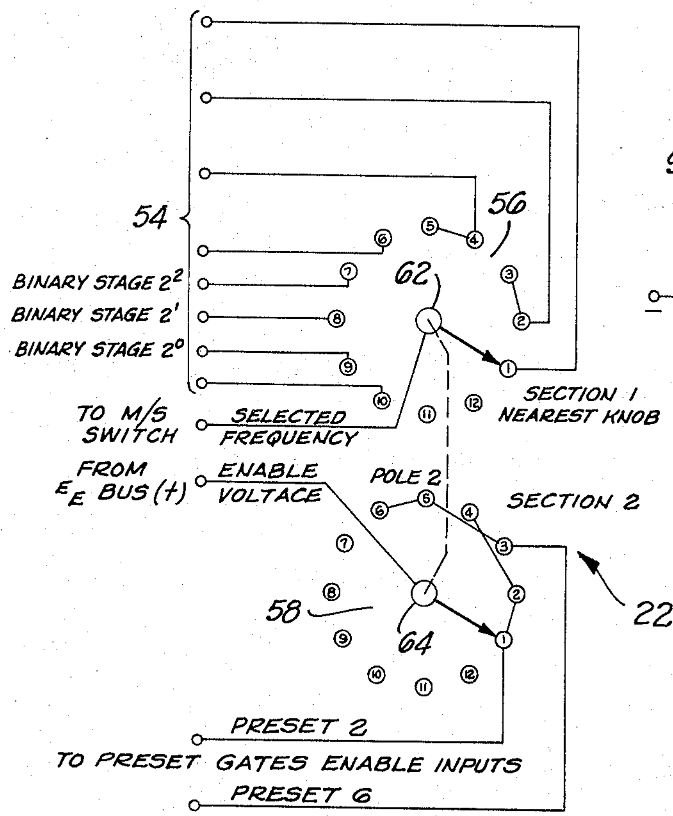
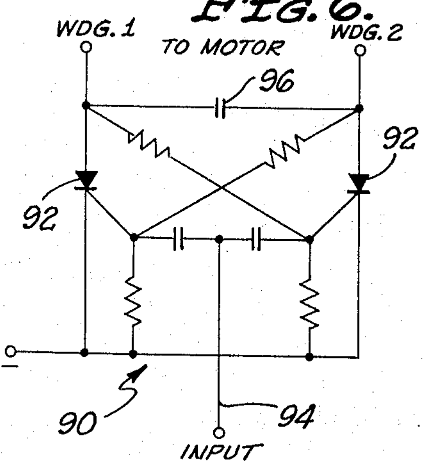
INVENTOR.
ROBERT THOMAS KAISER
BY
THOMAS P. MAHONEY
ATTORNEY United States Patent Office 3,373,329

Patented Mar. 12, 1968

3,373,329

DEVICE FOR DRIVING RECORDING CHARTS AT ANY ONE OF A PLURALITY OF PREDETERMINED SPEEDS

Robert Thomas Kaiser, San Diego, Calif., assignor, by mesne assignments, to Kinetics Corporation of California, Solana Beach, Calif., a corporation of California Filed Mar. 31, 1965, Ser. No. 444,161
8 Claims. (Cl. 318—305)

ABSTRACT OF THE DISCLOSURE

A frequency divider has a signal generator connected thereto, and is connected through a frequency selector switch to a master-slave switch. In master position, the master-slave switch connects the selector switch determined frequency to the controller of a stepping motor arranged for driving a chart, and in slave position, said master-slave switch connects an outside determined frequency therethrough in similar manner. A group of similar devices, one in the master condition and the others in the slave condition, with the stepping motor controllers thereof connected to the selector switch determined frequency of the master device, will drive a group of charts at synchronized speeds.

This invention relates to a chart drive system and, more particularly, to a chart drive system for driving recording charts of either the rotary or linear type at any one of a number of speeds.

As is well known to those skilled in the art, conventional chart drives are designed to operate at a predetermined speed selected at the time of installation of the chart drive to most adequately meet the needs of the equipment with which it is associated. If the need arises to change the speed at which the conventional chart drive operates, the drive sprockets, gears, or other components of the system must be removed and re-arranged to accomplish the speed change. The resultant expenditure of time and energy and the relative inflexibility of conventional chart drive systems has prevented them from being utilized where the usage was such as to demand immediate speed changes or speed changes made at points remote from the chart drive system itself.

It is, therefore, an object of my invention to provide a chart drive system which will drive a chart at any one of a number of predetermined speeds and which will permit speed changes to be made instantaneously from points remote from the chart drive motor or motors.

Another object of my invention is the provision of a chart drive system which is adapted to be utilized to drive the drive train of either a rotary chart drive or a lineal chart drive, and which is adapted to be associated with or have incorporated in the system a signal generating means adapted to generate a signal of predetermined frequency, said signal generating means having its output connected to frequency divider means in order that the signal may be divided into appropriate sub-multiple components, and the output of said frequency divider means being utilized, after suitable amplification and selection by a suitable selector switch, to drive a digital stepping motor which, in turn, is connected to the drive train of a conventional chart drive.

Another object of my invention is the provision of a multispeed chart drive system in which the signal generator is constituted by a DC power supply supplying a rectifier second signal, said DC power supply being connected to an AC source, and in which the frequency divider is a digital frequency divider having a chart speed selector switch associated therewith adapted to select a predetermined chart speed within the capability of the system. For instance, in the present embodiment of the system the chart can be driven in a wide range of speeds from 1 to 120 inches per hour. Obviously, other embodiments of the invention could be provided wherein the frequency of the signal or the design of the frequency divider would permit a different range of chart speeds with different intervals between the established speeds.

Still another object of my invention is the provision of a chart drive system of the aforementioned character in which the output of the digital frequency divider is utilized to drive a digital stepping motor connected in the gear train of the chart drive with which the chart drive system is associated.

An additional object of my invention is the provision of a chart drive system of the aforementioned character wherein a wide range of chart speeds can be selected by the utilization of a single rotary switch and wherein the chart drive system control can be located at a point remote from the chart drive itself in order that remote operation and control of one or more chart drives may be achieved.

A further object of my invention is the provision of a chart drive system of the aforementioned character which permits a plurality of chart drives to be controlled in synchronism by the connection of digital stepping motors to the chart drives.

An associated object of my invention is the control of a large number of charts in synchronism by the addition of slave units and associated digital stepping motors, said slave units being connected to a master unit which incorporates the signal generator.

Another object of my invention is the provision of a chart drive system of the aforementioned character which can be connected to the output of an external signal generating source to control charts. In this manner, it is possible to control chart speed by utilizing an external signal generating source as the criterion of the chart speed at which one or more chart drives is operated.

Other objects and advantages of the invention will be apparent from the following specification and the accompanying drawings, which are for the purpose of illustration only, and in which:

FIG. 3 is a schematic diagram showing the DC power supply;

FIG. 4 is a schematic diagram showing the mode of operation of the chart drive rate selector switch;

FIG. 5 is a schematic diagram showing the pre-set gates incorporated in the control unit; and FIG. 6 is a schematic diagram of the stepping motor controller.

Figure 1:
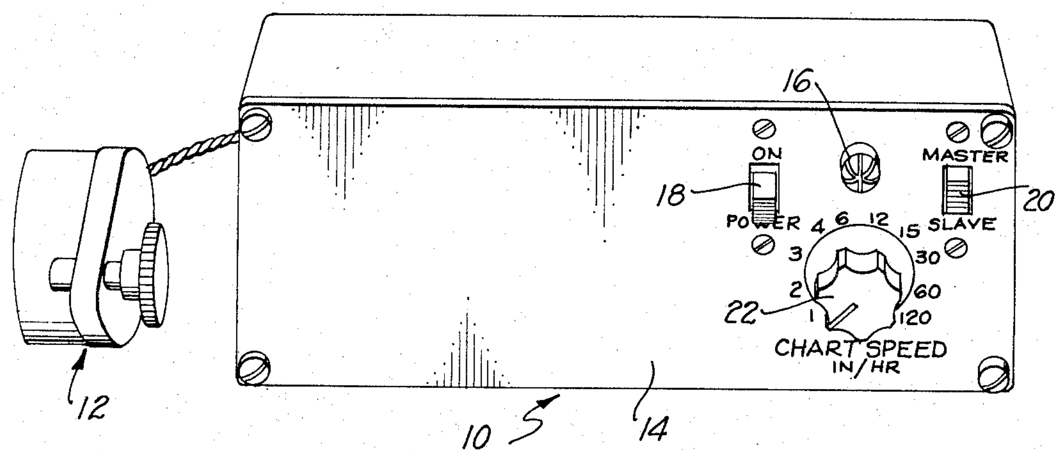
FIG. 1 is a perspective view showing the packaging of a master chart drive system unit and an associated digital stepping motor.

Referring to the drawings, and particularly to FIG. 1 thereof, I show a housing 10 which incorporates the components of the controller unit for a digital stepping motor 12, which is adapted to be utilized as the drive means for a conventional chart drive train of the conventional type in substitution for the drive motors customarily used. The concept of the invention envisions the provision of controller units incorporated in housings, such as the housing 10, and the substitution of digital stepping motors such as the motor 12 for the conventional electric drive motors initially installed in conventional chart drive constructions and, thus, permits the utilization of the chart drive system of the present invention to convert conventional units to digital speed control.

Incorporated in the front wall 14 of the housing 10 is a signal light 16 which indicates whether the control switch 18 has been actuated to energize the control unit. Also incorporated is a master slave switch 20, whose actuation permits the control unit to function as either a master or a slave, in a manner to be described in greater detail hereinbelow. Also mounted on the front wall of the housing 10 is a rotary selector switch 22, which permits the selection of the speed at which the stepping motor 12 is driven to determine the speed at which the chart will be driven.

Figure 2:
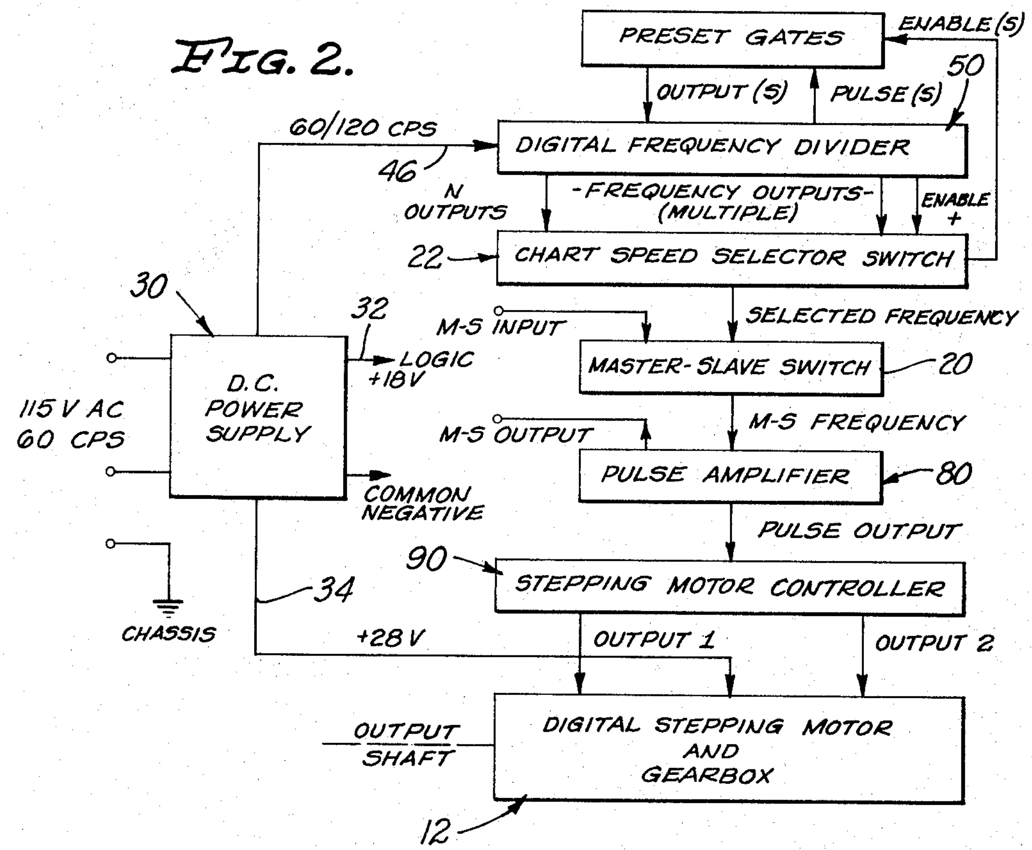
FIG. 2 is a block diagram of the control unit which is incorporated in the package shown in FIG. 1 of the drawings.

The circuitry of the controller unit is shown in FIG. 2 of the drawings, and includes a DC power supply 30 connected to the AC supply, said DC supply 30 being a conventional, full-wave bridge unregulated power supply with an 18 volt output, indicated at 32, and a 28 volt output indicated at 34. The 28 volt output is connected to the digital stepping motor and gear box, and provides the drive power for said stepping motor.

The DC power supply, as best shown in FIG. 3 of the drawings, includes an on-off power switch 38, a thermal breaker 42, and a 25.2 volt transformer 44. In addition the 28 volt output 34 and the 18 volt output 32, the power supply 30 provides a signal output 46 of predetermined frequency, in the present case, an AC half-wave rectified signal of 60 c.p.s. If desired, a diode 48 can be added to provide a full-wave rectified signal of 120 c.p.s.

The 60 cycle output of the DC power supply 30 is connected to a digital frequency divider 50, said digital frequency divider including a conventional squaring circuit, not shown, and "N" binary stages of division. The squaring circuit converts the powerline 60 cycle per second sine wave into a 60 cycle per second square wave in accordance with customary practice, and the square wave triggers a first binary stage or flip-flop, not shown. The output of the first binary stage is a 30 cycle per second square wave which triggers a second binary stage.

The second binary stage triggers a third binary stage, and a third binary stage triggers a fourth, and so on through succeeding stages.

Consequently, the frequency division continues down a train of "N" binary stages, the outputs obtained being $60^{cps}/2$, $60^{cps}/4$, and continuing to $60^{cps}/2^n$ for "N" stages of binary division. The outputs are connected to the successive positions of the rotary switch 22, as best shown in FIG. 4 of the drawings, the successive binary stages being indicated generally at 54.

It will be noted that the chart speed selector switch 22, FIG. 4, is a rotary switch incorporating a first section 56 and a second section 58, each section having $N+1$ positions. The outputs of the squaring circuit and the binary stages are connected to the successive positions on the first section 56 of the switch 22, and the slider or pole portion 62 of the first section 56 of the switch 22 is connected to the master slave switch 20.

Before considering the functioning of the master slave switch 20, it should be pointed out that the first, second and fourth positions of the second section 58 of the rotary switch 22 are connected to pre-set gate 2, and the third, fifth and sixth positions are connected to pre-set gate 6, the pole 64 of the second section being connected to enable voltage from the digital frequency divider. Both poles of the selector switch 22 rotate when the switch knob is rotated.

The pole 62 provides a means of selecting any one of the binary rates of pulsing the stepping motor, and the second pole 64 provides a feedback means to the digital frequency divider 50 to obtain non-binary divisions of the 60 cycle per second input frequency. Non-binary divisions are accomplished by pre-setting the frequency divider with preset gates, in a manner to be described in greater detail hereinbelow.

To accommodate the non-binary divisions, additional switch positions are added to the first section 56 of the rotary switch 22. For example, the fifth stage of the voltage divider 50 has an output frequency of $60^{cps}/2^5$ with no pre-set. Pre-setting four counts at stage 3 of the divider 50 causes the output of the fifth stage to be $60^{cps}/(2^5)-4$, which requires a separate switch position.

The connection of selected positions on the second section 58 of the rotary switch 12 to the pre-set gate, as best shown in FIG. 4 of the drawings, permits a selected binary stage or binary stages to be utilized to achieve a non-binary frequency division. Each gate 70 and 72, as best shown in FIG. 5 of the drawings, includes a capacitor 74, a resistor 76, and a diode 78.

The capacitor 74 of each gate has an input which is the trigger pulse input; the resistor input is the DC enable from the chart speed selector switch 22, and the diodes 74 provide isolation between the two inputs and the outputs of the gates 70 and 72.

In order that a trigger pulse pass through the gate and pre-set a selected binary stage, the enable voltage must be positive. By connecting the various binary stage outputs to the pulse outputs and switching the positive enable voltage to the various enable inputs by means of the second section 58 of the rotary switch 22, the desired non-binary divisions are obtained.

The output of the chart speed selector switch is connected to the input of a master-slave switch 20, as best shown in FIG. 2 of the drawings, in order that a choice may be made as to the operation of the control unit as either a master or slave, that is, to determine whether the control unit will be operated by the signal from the DC power supply 30 or whether it will be operated from a device which generates a signal which is external to the housing 10. The master-slave switch 20 is adapted to be maintained in one of two conditions, that is, where the control unit is adapted to be operated from the internal signal generator or where it is adapted to be operated from an external frequency source.

In addition to providing a control unit which is capable of operating in either the master or slave condition, it is also possible to provide units whose only function is to serve as slave units, that is, units which do not incorporate in the control system a single generating device, but which are responsive, either to the signal generated by a master unit, or to a signal which is derived from an external signal generating source.

Consequently, it is possible to utilize a plurality of master-slave units in parallel series by placing the subsequent master-slave units in the slave condition, or it is possible to utilize one master-slave unit in conjunction with a plurality of units which are conditioned for slave operation only. Moreover, the master-slave units can be conditioned for operation from an external signal generator, or can be conditioned for operation by other master-slave units.

The master-slave switch 20, therefore, permits the output of a pulse amplifier 80, FIG. 2, to be utilized to pulse the master-slave line. When the unit is utilized as a slave unit, the master-slave switch 20 disconnects the input of the pulse amplifier 80 from the output of the rotary switch 22 and connects it to the master-slave line. This allows an external signal generator to pulse the pulse amplifier and, consequently, the stepping motor controller.

The stepping motor controller 90 is connected to the output of the pulse amplifier and, as best shown in FIG. 6 of the drawings, is constituted by a SCR bi-stable driving circuit and the windings of the stepping motor 12 function as anode loads on the two silicon controlled rectifiers 92.

One SCR is on, and the other one is off at any time. The imposition of a pulse input on the input 94 of the controller 90, FIG. 6, causes the off SCR to turn on, with the result that this signal is reflected to the opposite silicon controlled rectifier 92 through the anode 96, causing it to turn off. Consequently, the windings of the stepping motor 12 are successively and incrementally energized in this manner to take one precisely measured step for each input pulse to the stepping motor controller.

As previously indicated, the stepping motor 12 and the associated reduction gearing, not shown, are of conventional construction and constitute no part of the present invention other than as they are embodied in a total system concept.

Therefore, I provide by my invention a chart drive control system which will permit any one of a plurality of speeds of drive to be selected at a point remote from the chart drives. In addition, the controller unit of the system can be utilized in either a master or slave condition to permit the charts to be driven in response to an internally or externally generated signal of uniform frequency, and the invention can be applied to a configuration in which a plurality of slave units are subjected to the signal from a master-slave unit or to the signal from an external signal generating source.

Moreover, in the present embodiment of my invention, it is possible to drive up to three recording chart drives from a single master unit by adding two more stepping motors to the system, and when a single master-slave unit is utilized in conjuncation with a plurality of slave units, it is possible to drive an unlimited number of charts.

Although the invention has been herein shown and described in what is conceived to be the most practical and preferred embodiment thereof, it is recognized that departures may be made therefrom within the scope of the invention, which is not to be limited to the details disclosed herein, but is to be accorded the full scope of the claims so as to embrace any and all equivalent structures and devices.

I claim:

1. In a device for operating a chart at any one of a plurality of predetermined speeds, the combination of: a frequency divider, means operatively associated with said frequency divider for connecting a signal generator to an input thereof; selector switch means operatively connected to an output of said frequency divider for determining the frequency of said output; master-slave switch means having an input and output side, said master-slave switch means being selectively movable between a master position and a slave position, said master-slave switch means when moved to said master position being adapted for operatively connecting said determined frequency of said selector switch between said input and output sides thereof, said master-slave switch means when moved to said slave position being adapted for operatively connecting an exterior determined frequency between said input and output sides thereof; a stepper motor including control means operatively connected to said output side of said master-slave switch means for receiving one of said determined frequencies of said output side according to said position of said master-slave switch means; and means for connecting said stepper motor for driving a chart.

2. A device as defined in claim 1 in which said master-slave switch means at least when moved to said master position is adapted for the connection of at least one additional control means of an additional stepper motor thereto for reception of said selector switch determined frequency by said additional control means; and in which there is means for connecting said additional stepper motor for driving an additional chart.

3. A device as defined in claim 1 in which said device has said master-slave switch means thereof moved to said master position so that said device is thereby a master device; in which a slave device comprises a stepper motor including control means operatively connected to said output side of said master-slave switch means of said master device for receiving said selector switch determined frequency; and in which there is means for connecting said slave device stepper motor for driving a chart.

4. A device as defined in claim 1 in which said device has said master-slave switch means thereof moved to said master position so that said device is thereby a master device; in which a series of slave devices each comprises a stepper motor including control means operatively connected to said output side of said master-slave switch means of said master device for receiving said selector switch determined frequency; and in which there is means for connecting each of said slave device stepper motors for driving a chart.

5. A device as defined in claim 1 in which said device has said master-slave switch means thereof moved to said master position so that said device is thereby a master device; and in which at least one slave device is substantially identical to said master device with the exception that said master-slave switch means of said slave device is moved to said slave position, said control means of said slave device stepper motor being operatively connected to said output side of said master-slave switch means of said master device for receiving said selector switch determined frequency.

6. In a device for operating a chart at any one of a plurality of predetermined speeds, the combination of: a digital frequency divider, means operatively associated with said frequency divider for impressing a generated signal thereon; selector switch means for selecting the desired output signal of said frequency divider and transmitting a determined frequency of said output signal; master-slave switch means operatively connected to said selector switch means, said master-slave switch means being movable to a master position for transmitting said selector switch determined frequency therethrough when in said master position, said master-slave switch means being movable to a slave position for transmitting an exterior determined frequency therethrough when moved to said slave position; a stepper motor including control means operatively connected to said master-slave switch means for receiving one of said determined frequencies of said master-slave switch means according to said position of said master-slave switch means; and means for connecting said stepper motor for driving a chart.

7. A device as defined in claim 6 in which said device has said master-slave switch means thereof moved to said master position so that said device is a master device; in which an additional control means of an additional stepper motor is operatively connected to said master-slave switch means of said master device for receiving said selector switch determined frequency of said master device; and in which there is means for connecting said additional stepper motor for driving a chart.

8. A device as defined in claim 6 in which said device has said master-slave switch means thereof moved to said master position so that said device is a master device; and in which at least one slave device is substantially identical to said master device with the exception that said master-slave switch means of said slave device is moved to said slave position and is operatively connected for receiving said selector switch determined frequency from said master device.

References Cited

UNITED STATES PATENTS

| | | | |
|---|---|---|---|
| 2,910,638 | 10/1959 | Linn | 318—341 X |
| 2,945,997 | 7/1960 | Kennedy | 318—344 |
| 3,005,940 | 10/1961 | Johnson | 318—305 |
| 3,215,918 | 11/1965 | Lichowsky | 318—305 X |

ORIS L. RADER, *Primary Examiner.*

J. J. BAKER, *Assistant Examiner.*